United States Patent
Meier et al.

(10) Patent No.: US 11,220,214 B1
(45) Date of Patent: Jan. 11, 2022

(54) VEHICLE VIEWING SYSTEM AND METHOD INCLUDING ELECTRONIC IMAGE DISPLAYS FOR REARWARD VIEWING BY A DRIVER

(71) Applicant: Robert Bosch GmbH, Stuttgart (DE)

(72) Inventors: Michael R. Meier, Walled Lake, MI (US); Christian Sperrle, Ann Arbor, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/984,799

(22) Filed: Aug. 4, 2020

(51) Int. Cl.
| | |
|---|---|
| *B60R 1/00* | (2006.01) |
| *G06K 9/00* | (2006.01) |
| *H04N 5/247* | (2006.01) |
| *H04N 5/262* | (2006.01) |
| *H04N 5/272* | (2006.01) |

(52) U.S. Cl.
CPC .......... *B60R 1/00* (2013.01); *G06K 9/00791* (2013.01); *G06K 9/00845* (2013.01); *H04N 5/247* (2013.01); *H04N 5/2628* (2013.01); *H04N 5/272* (2013.01); *B60R 2300/105* (2013.01); *B60R 2300/20* (2013.01); *B60R 2300/304* (2013.01); *B60R 2300/802* (2013.01); *B60R 2300/8006* (2013.01)

(58) Field of Classification Search
None
See application file for complete search history.

(56) References Cited

U.S. PATENT DOCUMENTS

| | | | |
|---|---|---|---|
| 7,199,767 | B2 | 4/2007 | Spero |
| 9,931,985 | B1 | 4/2018 | Pertsel et al. |
| 10,116,873 | B1 | 10/2018 | Campbell |
| 10,486,599 | B2 | 11/2019 | Baur |
| 10,518,703 | B1 | 12/2019 | Pertsel et al. |
| 2016/0137126 | A1 | 5/2016 | Fursich et al. |
| 2016/0280136 | A1 | 9/2016 | Besson |
| 2017/0060234 | A1* | 3/2017 | Sung ............... G06F 3/1431 |
| 2018/0134217 | A1* | 5/2018 | Peterson ........... G08G 1/167 |
| 2018/0160030 | A1* | 6/2018 | Chaney, Jr. ....... H04N 7/181 |
| 2018/0304814 | A1* | 10/2018 | Tschirhart ........ B60R 1/00 |
| 2019/0244040 | A1 | 8/2019 | Herrmann et al. |

FOREIGN PATENT DOCUMENTS

WO   WO-2019135099 A1 * 7/2019 ............... B60R 1/00

* cited by examiner

*Primary Examiner* — Rebecca A Volentine
(74) *Attorney, Agent, or Firm* — Michael Best & Friedrich LLP

(57) ABSTRACT

A system and method provide rearward viewing for a vehicle driver. The rearward viewing system includes left side and right side video cameras for obtaining video image rearwardly outwardly from the sides of the vehicle. Left side and right side electronic image displays display portions of the images. A vehicle interior driver monitoring camera senses an upper body position of a driver. An electronic processor is configured to receive an upper body position and determine portions of the left side video images to display on the left side electronic image display, and to determine portions of the right side video images to display on the right side electronic image display. Additional movements of a driver adjust a field of view of the left side video images by changing portions thereof that are provided to the left side electronic image display. Right side and rearview images are also adjusted.

19 Claims, 9 Drawing Sheets

VEHICLE VIEWING SYSTEM AND METHOD INCLUDING ELECTRONIC IMAGE DISPLAYS FOR REARWARD VIEWING BY A DRIVER

FIELD

This arrangement relates to a system and method for providing rearward images for viewing by a driver of a vehicle utilizing electronic image displays instead of sideview mirrors and a rearview mirror. Further features include changing the electronic image in response to movement of a head of a driver, and augmenting images to increase visibility of difficult objects to detect visually.

SUMMARY

One embodiment is directed to rearward viewing system for a driver of a vehicle. The rearward viewing system comprises a left side video camera for obtaining left side video images taken rearwardly and outwardly from a left side of the vehicle, a left side electronic image display disposed near a front left side window for displaying portions of the left side video images received from the left side video camera, a right side video camera for obtaining right side video images taken rearwardly and outwardly from a right side of the vehicle, a right side electronic image display disposed near a front right side window for displaying portions of the right side video images received from the right side video camera, a vehicle interior driver monitoring camera for sensing an upper body position of a driver, and an electronic processor and a memory. The electronic processor is configured to: receive an upper body position of a driver from the vehicle interior driver monitoring camera; from an upper body position, determine portions of the left side video images to display on the left side electronic image display, and to determine portions of the right side video images to display on the right side electronic image display; determine movements of an upper body position of a driver from the vehicle interior driver monitoring camera; and adjust a field of view of the left side video images that are displayed on the left side electronic image display by changing portions of the left side video images that are provided to the left side electronic image display in response to the movements of an upper body position of a driver.

Another embodiment is a method for providing rearward viewing to a driver of a vehicle including an electronic processor. The method includes: obtaining rearward video images with a rearwardly oriented video camera; receiving the rearward video images at the electronic processor; determining an upper body position of a driver with a vehicle interior driver monitoring camera; receiving an upper body position at the electronic processor; from an upper body position of a driver, the electronic processor determining a portion of the rearward video images for display on a rearview electronic image display disposed at an upward, front central location in an interior of the vehicle; determining movements of an upper body position of a driver; and adjusting a field of view of the rearward video images displayed on the rearview electronic image display based on the movements of an upper body position of a driver by changing the portion of the rearward video images provided to the rearview electronic image display.

Another embodiment is directed to a method for providing rearward and outward viewing to a driver of a vehicle including an electronic processor. The method includes obtaining side video images rearwardly and outwardly from a side of a vehicle with a side video camera; determining an upper body position of a driver with a vehicle interior driver monitoring camera; from an upper body position of a driver, determining a portion of the side video images for display on a side electronic image display; displaying portions of the side video images on the side electronic image display disposed near a front side window of the vehicle; determining movements of an upper body position of a driver; and adjusting the field of view by changing the portions of the side video images displayed on the side electronic image display based on the movements of an upper body position of a driver by changing the portions of the side video images provided to the side electronic image display.

Other aspects, features, and embodiments will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable media) executable by one or more electronic controllers. For example, "electronic processors," "units," "control units," and "controllers" described in the specification can include one or more electronic controllers, one or more memories including non-transitory computer-readable media, one or more input/output interfaces, one or more application specific integrated circuits (ASICs) and other circuits, and various connections or connectors (for example, wires, printed traces, and buses) connecting the various components.

Figure 1:
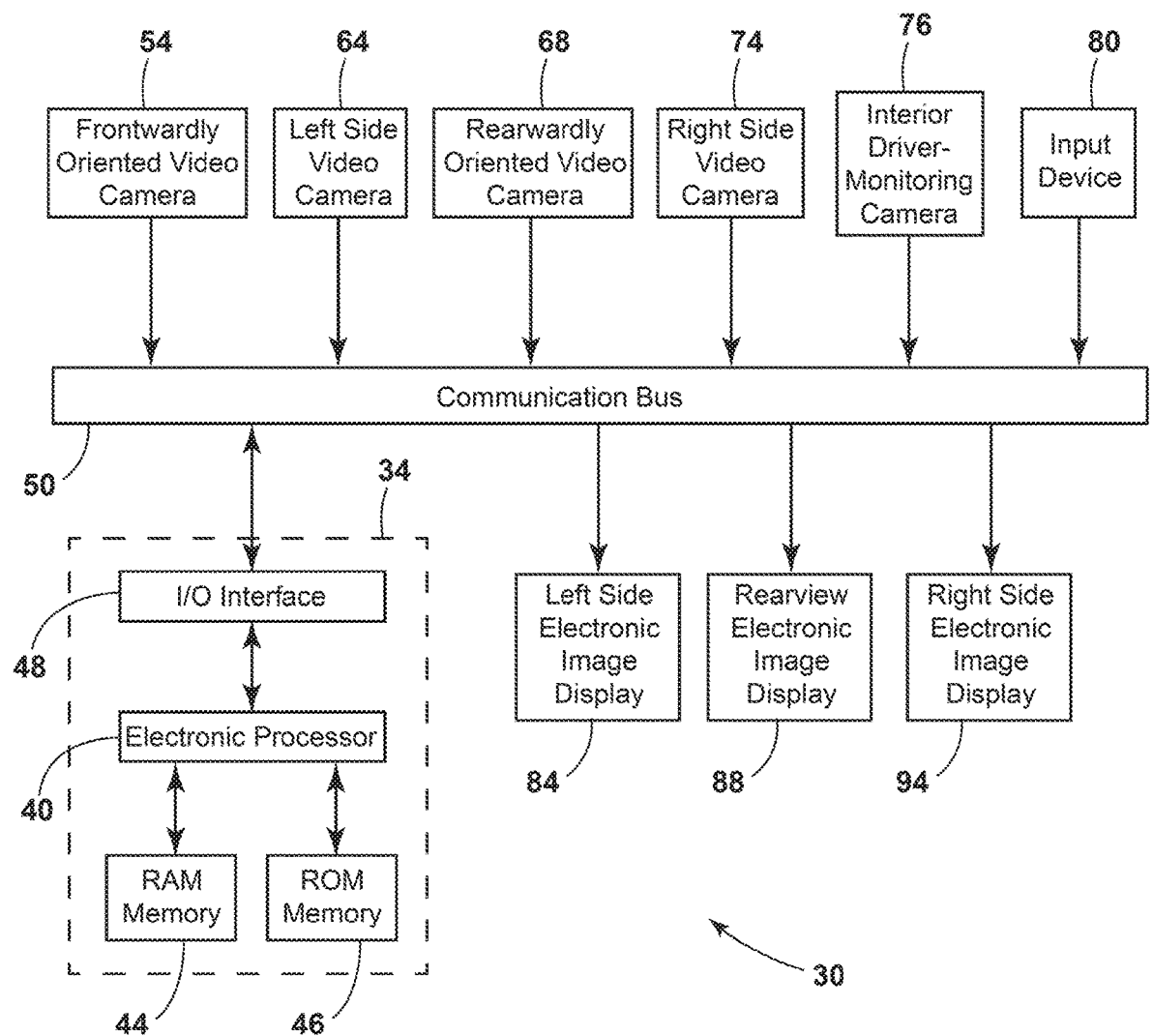
FIG. 1 illustrates a block diagram of one embodiment of a vehicle viewing system including electronic image displays.

FIG. 1 shows a block diagram view of a vehicle viewing system 30 for providing rearward video images to a vehicle driver. In one embodiment, the vehicle viewing system 30 includes an electronic unit 34. The electronic unit 34 includes an electronic processor 40 and a memory. The memory includes one or more memory modules, such as a random access memory ("RAM") 44 and/or an electronically erasable programmable read-only memory ("EEPROM") 46. An input/output interface 48 transmits and receives information over a communication bus 50. The electronic processor 40 processes the information by executing one or more applications or modules. The applications or modules can be stored as instructions or commands in the memory 44, 46. The electronic processor 40 also stores information in the memory 44 generated by applications.

The communication bus 50 shown in FIG. 1 is a FlexRay automotive communication bus, controller area network (CAN) bus or other type of communication link between a plurality of control units, sensors, and other devices. In some embodiments, the communication bus 50 connects the electronic unit 34 to a frontwardly oriented video camera 54 mounted on a front hood or front bumper of a vehicle for providing frontward images.

FIG. 1 also shows a left side video camera 64 that is provided on a left side of a vehicle to obtain video images rearwardly and leftwardly of a vehicle for display. FIG. 1 also shows a rearwardly oriented video camera 68 that is mounted to a rear of the vehicle roof, or on or near a vehicle back bumper to obtain video images to the rear of a vehicle. In one embodiment, the rearwardly oriented video camera 68 is a panoramic camera with at least a 170 degree field of view. Other arrangements are also contemplated. FIG. 1 also shows a right side video camera 74 that is provided on a right side of a vehicle to obtain video images rearwardly and rightwardly of a vehicle for display. In some embodiments, the cameras are digital video cameras. The cameras 64, 68, 74 are fixedly mounted and unable to pan or otherwise be adjusted after calibration. Various types of cameras are contemplated.

Figure 2:
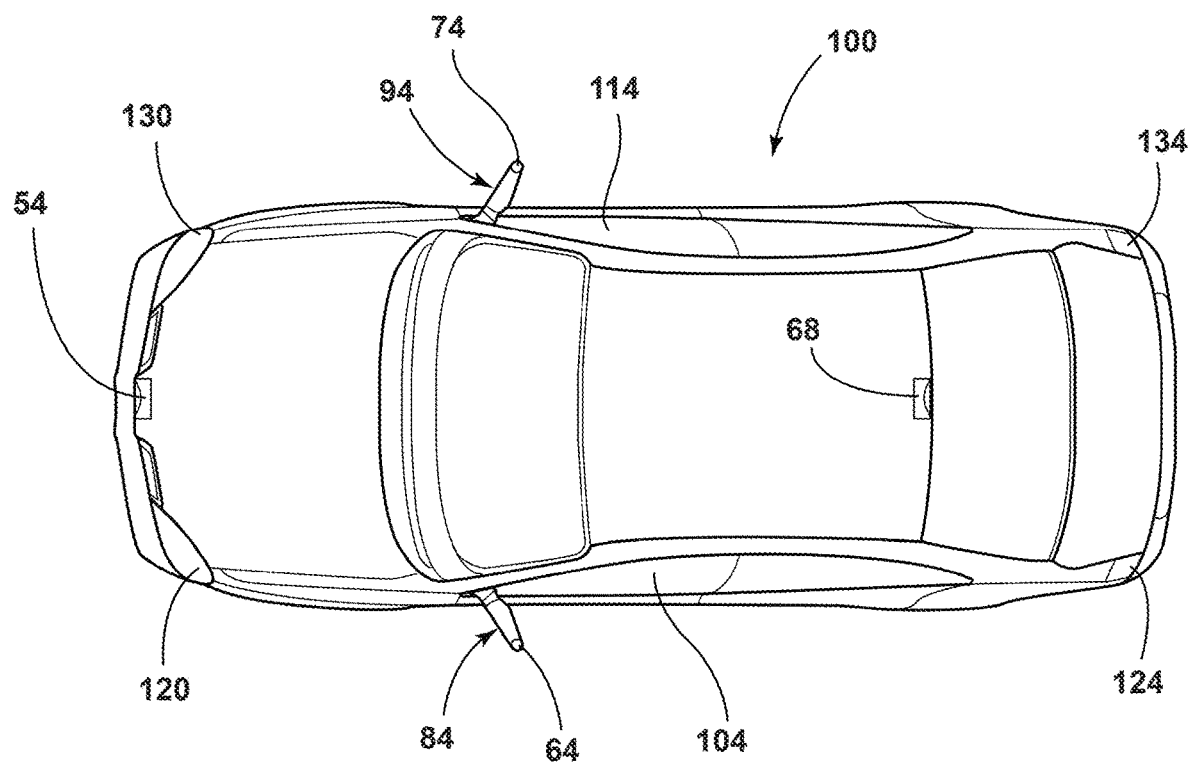
FIG. 2 illustrates a top view of a vehicle that includes the vehicle viewing system.

FIG. 1 shows an interior driver monitoring camera 76 for providing images of a driver in an interior of a vehicle. The interior driver monitoring camera 76 is mounted in the interior of the vehicle facing the driver in an orientation to get a good perspective view of the driver and a head position thereof. In some embodiments, the interior driver monitoring camera 76 can be mounted to a steering wheel, a dashboard, a windshield, or to an interior roof at the front of the vehicle. The interior driver monitoring camera 76 detects driver images that are provided to the electronic processor 40 over the communication bus 50 in one embodiment. FIG. 2 shows an input device 80, such as a keyboard, joystick, keypad or other data entry mechanism, such as a microphone and voice analysis to receive voice commands.

FIG. 1 shows a left side electronic image display 84 for showing at least a portion of the video images from the left side video camera 64. FIG. 1 also shows a rearview electronic image display 88 for displaying the rearward video images from the rearwardly oriented video camera 68 to a vehicle driver. In one embodiment, the rearview electronic image display 88 is mounted upwardly toward a top, front central location of the windshield in a manner similar to a central rearview mirror in known vehicles. In another embodiment, the rearview electronic image display 88 is mounted in a vehicle console or vehicle dashboard. In one embodiment, the rearview electronic image display 88 is a touchscreen that is integrated into a single element with the input device 80 that a driver uses to provide inputs to the electronic unit 34.

Finally, FIG. 1 shows a right side electronic image display 94 for displaying video images provided over the communication bus 50 from the right side video camera 74. The electronic image displays 84, 88, 94 are light crystal displays (LCD), organic light emitting diode (OLED) displays, or other types of displays or panels for video images that are displayed in real time for use by a driver.

FIG. 2 shows a top view of a vehicle 100 that includes a frontwardly oriented video camera 62. FIG. 2 shows a left side electronic image display 84 projecting outwardly from a left side of the vehicle. The left side electronic image display 84 supports a left side video camera 64 at a horizontal distal end thereof in one embodiment. FIG. 2 shows a right side electronic image display 94 projecting outwardly from a right side of the vehicle 100. The right side electronic image display 94 supports a right side video camera 74 at a distal end thereof in one embodiment. The left side video camera 64 and the right side video camera 74 are oriented rearwardly and outwardly to detects objects in respective blind spots of the vehicle. In some embodiments, the video cameras 64, 74 have a field of view of 90 degrees or more to detect objects in the respective blind spots of the vehicle 100. The vehicle has a left front side window 104 and a right front side window 114 near the left side electronic image display 84 and the right side electronic image display 94, respectively. The vehicle 100 also includes a left front turn signal 120 and a left rear turn signal 124. Finally, the vehicle 100 includes a right front turn signal 130 and a right rear turn signal 134 as shown in FIG. 2. The turn signals 120, 124, 130, 134 include lamps or lights that are activated by a turn signal actuator.

Operation

In operation, the electronic unit 34 operates various electronic image displays 84, 88, 94 to provide a driver with views to the rear and sides of the vehicle 100. The rearview electronic image display 88, the right side electronic image display 94, and the left side electronic image display 84 operate simultaneously. However, for purposes of discussion, the displays are discussed separately.

Rearview Electronic Image Display

Figure 3:
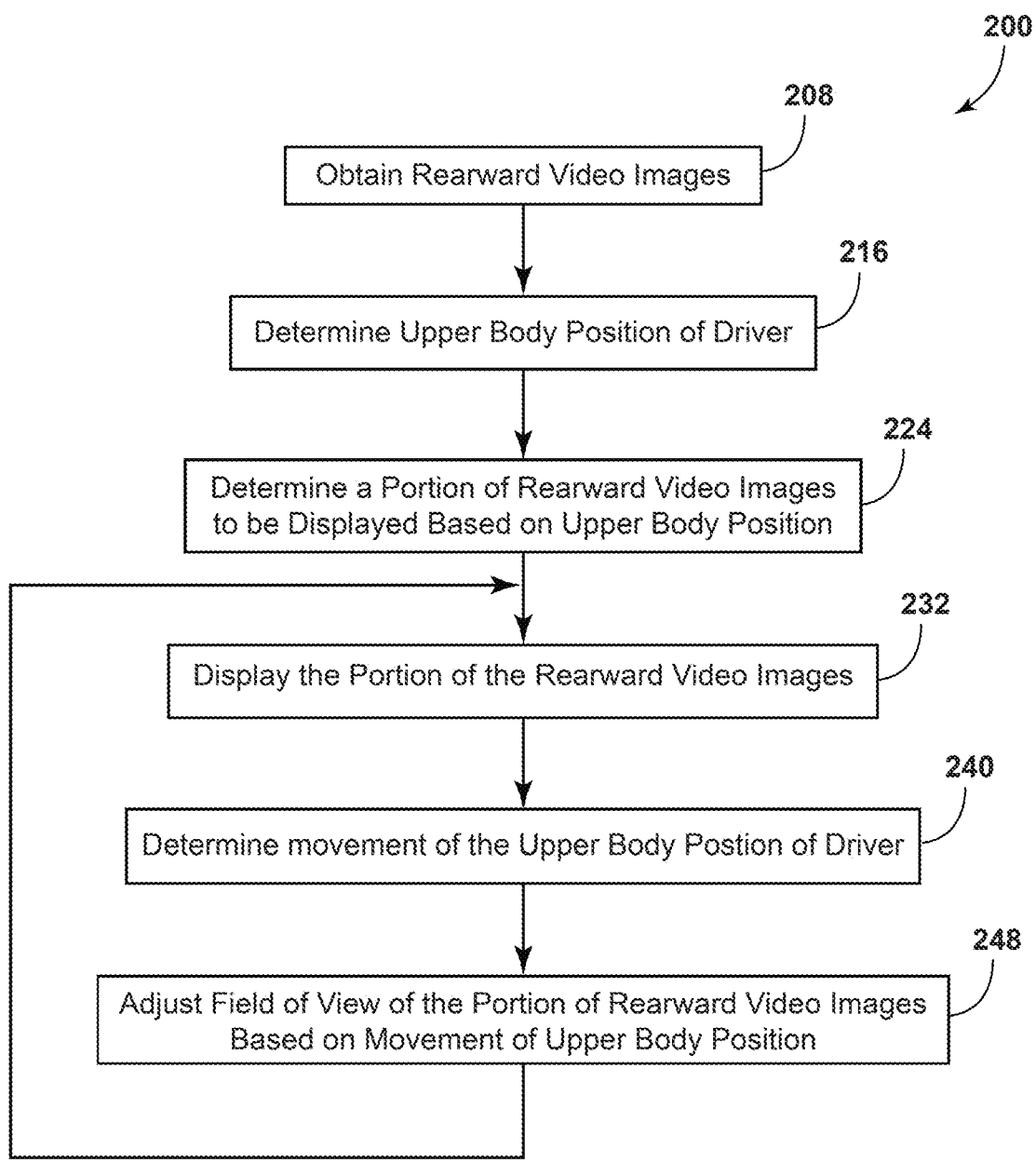
FIG. 3 illustrates a flow chart of an embodiment for operation of a rearview electronic image display.

FIG. 3 shows a flow chart 200 of the operation of the rearview electronic image display 88 for the electronic unit 34 shown in FIG. 1. While a single electronic unit 34 is shown in FIG. 1, multiple electronic units and/or electronic processors 40 can perform the various functions shown in FIG. 3. The multiple steps shown in FIG. 3 can occur essentially simultaneously or in parallel with multiple electronic processors of the electronic unit 34.

At step 204, in one embodiment, rearward video images are obtained by the electronic processor 40 from the rearwardly oriented video camera 68 over the communication bus 50. The electronic processor advances to step 216.

At step 216, the interior driver monitoring camera 76 provides video images of an upper body of a driver to the electronic processor 40 to determine an upper body position of a driver in the vehicle 100. The electronic processor 40 determines a portion of rearward video images to be displayed based on an upper body position. The electronic processor 40 advances to step 232.

At step 232, the electronic processor 40 displays the portion of the rearward video images on the rearview electronic image display 88 at an upward, front central location in an interior of the vehicle. The electronic processor 40 advances to step 240.

At step 240, the electronic processor 40 determines movement of an upper body position of a driver received from the interior driver monitoring camera 76. The electronic processor 40 advances to step 248.

At step 248, the field of view of the rearview electronic image display 88 is adjusted by the electronic processor 40 based on movement of an upper body position of a driver to change the portions of the rearward video images provided for display. The electronic processor returns to step 232, to display the changed portions of the rearward video images and repeats the steps 232, 240, 248.

Thus, in operation, the field of view is adjusted so that the portions of the rearward video images provided to the rearview electronic image display 88 are changed to provide a mirror simulating effect during the movements of an upper body position of a driver.

In one embodiment, changes of an upper body position of a driver can be determined by sensing eye position for eyes of a driver from video images from the interior driver monitoring camera 76. In another embodiment, the head position and direction that the head faces are determined or classified from video images from the interior driver monitoring camera 76 at step 240.

In one embodiment, the rearwardly oriented video camera 68 has a field of view of almost 180 degrees and is a panoramic type of video camera. The field of view provided on the display can be 90 degrees or more in some embodiments. When a driver in a right handed vehicle sitting in a left front seat moves their head to the left, the electronic processor 40 adjusts the portion of the video image displayed such that more of the image to the right of the vehicle appears and less of the image to the left is visible on the rearview electronic image display 88. Thus, the rearview electronic image display 88 is controlled by the vehicle viewing system 30 to effectively simulate the operation of a mirror in some embodiments. Therefore, shifting of the upper body of a driver to the left in a right hand drive vehicle shifts the field of view of the rearward video images provided on the rearview electronic image display 88 to the rear right, thus adding a portion from a right rear horizontal region of the rearward video images and removing a portion from a left rear horizontal region of the rearward video images.

Right Side Electronic Image Display

Figure 4:
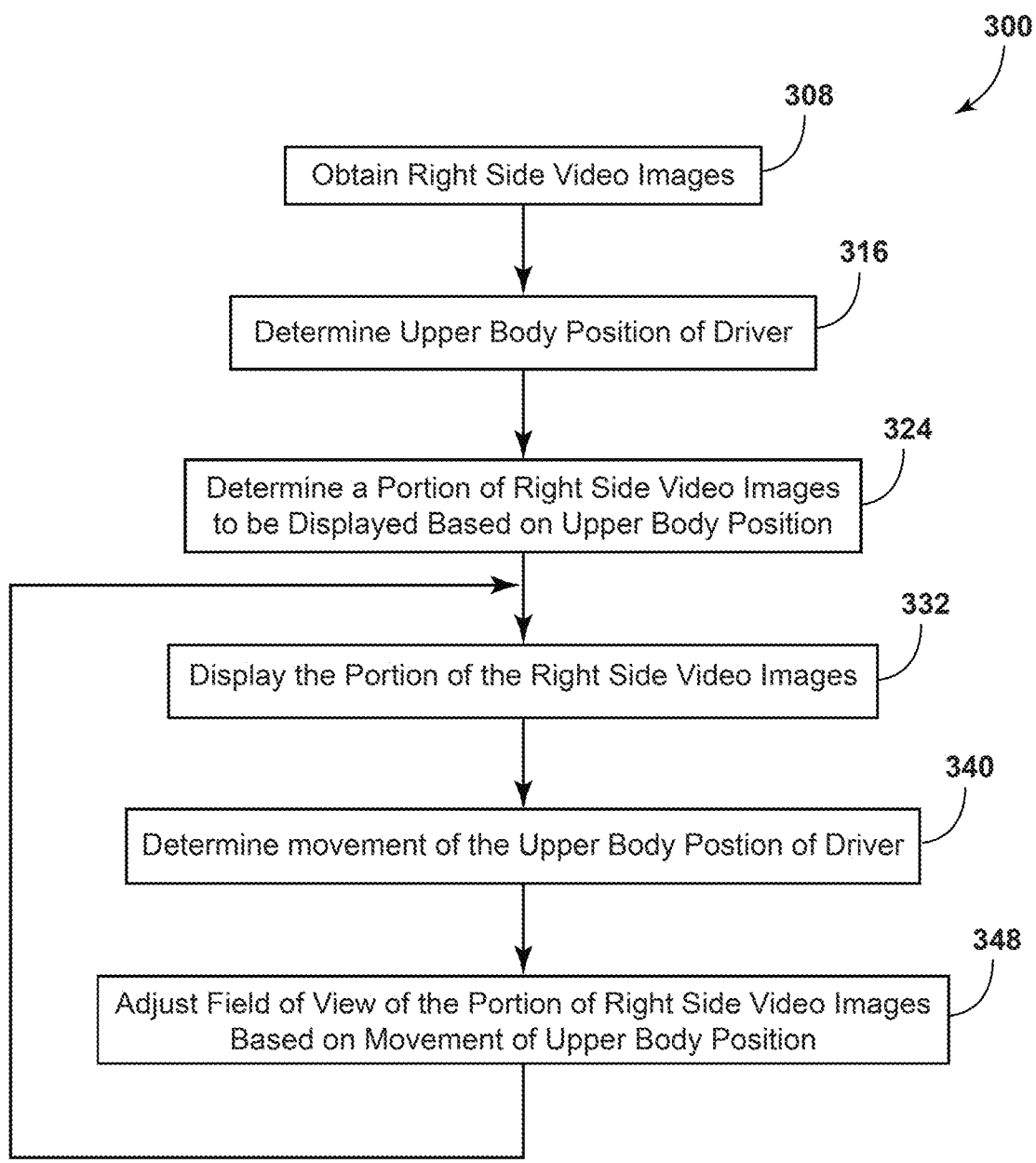
FIG. 4 illustrates a flow chart of an embodiment for operation of a side electronic image display.

FIG. 4 shows a flow chart 300 of the operation of the right side electronic image display 94 for the electronic unit 34 shown in FIG. 1. While a single electronic unit 34 is shown in FIG. 1, multiple electronic units and/or electronic processors 40 can perform the various functions shown in FIGS. 3 and 4. The multiple steps shown in FIGS. 3 and 4 can occur essentially simultaneously or in parallel with multiple electronic processors of the electronic unit 34.

At step 308, in one embodiment, right side video images taken rearwardly and outwardly by the right side video camera 74 are obtained by the electronic processor 40 over the communication bus 50. The electronic processor advances to step 316.

At step 316, the interior driver monitoring camera 76 provides video images of an upper body of a driver to the electronic processor 40 to determine an upper body position of a driver in the vehicle 100. At step 324, the electronic processor 40 determines a portion of right side video images to be displayed based on an upper body position. The electronic processor 40 advances to step 332.

At step 332, the electronic processor 40 displays the portion of the right side video images on the right side electronic image display 94 at a location to the vehicle exterior in front of the right front side window 114 in one embodiment. The electronic processor 40 advances to step 340.

At step 340, the electronic processor 40 determines movement of an upper body position of a driver received from the interior driver monitoring camera 76. The electronic processor 40 advances to step 348.

At step 348, the field of view of the right side electronic image display 94 is adjusted by the electronic processor 40 based on movement of an upper body position of a driver to change the portions of the right side video images provided for display. The electronic processor 40 returns to step 332, to display the changed portions of the rearward video images and repeats the steps 332, 340, 348.

Thus, in operation, the field of view of the right side electronic image display 94 is adjusted so that the portions of the rearward video images provided to the right side electronic image display 94 are changed to provide a mirror simulating effect during the movements of an upper body position of a driver. For instance, a shifting of a driver away from the right side electronic image display changes the portions of the right side video images that are displayed. Thus, the operation is similar to the operation of the rearview electronic image display 88.

Left Side Electronic Image Display

The left side electronic image display 84 includes the left side video camera 64 disposed at a distal end thereof. The left side electronic image display 84 is operated by the electronic unit 34 in a similar manner to the arrangement for the right side electronic image display 94 shown in FIG. 4. Thus, shifting of the upper body of a driver to the right shifts the field of view of the portions of the left side video images provided on the left side electronic image display 84 to the left, thus adding a previously unseen portion of the video image outwardly and horizontally to the left rear side of the vehicle 100 and removing the portions of the left side video images corresponding to inside and near the vehicle. Accordingly, further discussion is not necessary. Note that the left side electronic image display 84, the right side electronic image display 94, and the rearview electronic image display 88 are operable essentially simultaneous by the same electronic processor 40 of the electronic unit 34 or separate individual electronic processors. In one embodiment, separate individual electronic processors are provided with the respective electronic image displays 84, 88, 94.

There are enhancements and additional embodiments provided. In one embodiment, a complete view field of the left side video camera 64 is in a range from about 80 degrees to about 120 degrees, and wherein the field of view of the portions of the left side video images that are displayed on the left side electronic image display 84 is provided at a standard field of view (FoV). In one embodiment, the standard FoV is in a range from about 40 degrees to about 60 degrees. The same complete view field is provided for the right side video camera 74 and the same range is provided for the right side electronic image display 94 in another embodiment. Other values for the standard FoV are contemplated.

Operation will be explained with respect to the right side electronic image display 94. The additional embodiments are also operable with respect to the left side electronic image display 84.

Side Electronic Image Display Expanded Field of View

Figure 5:
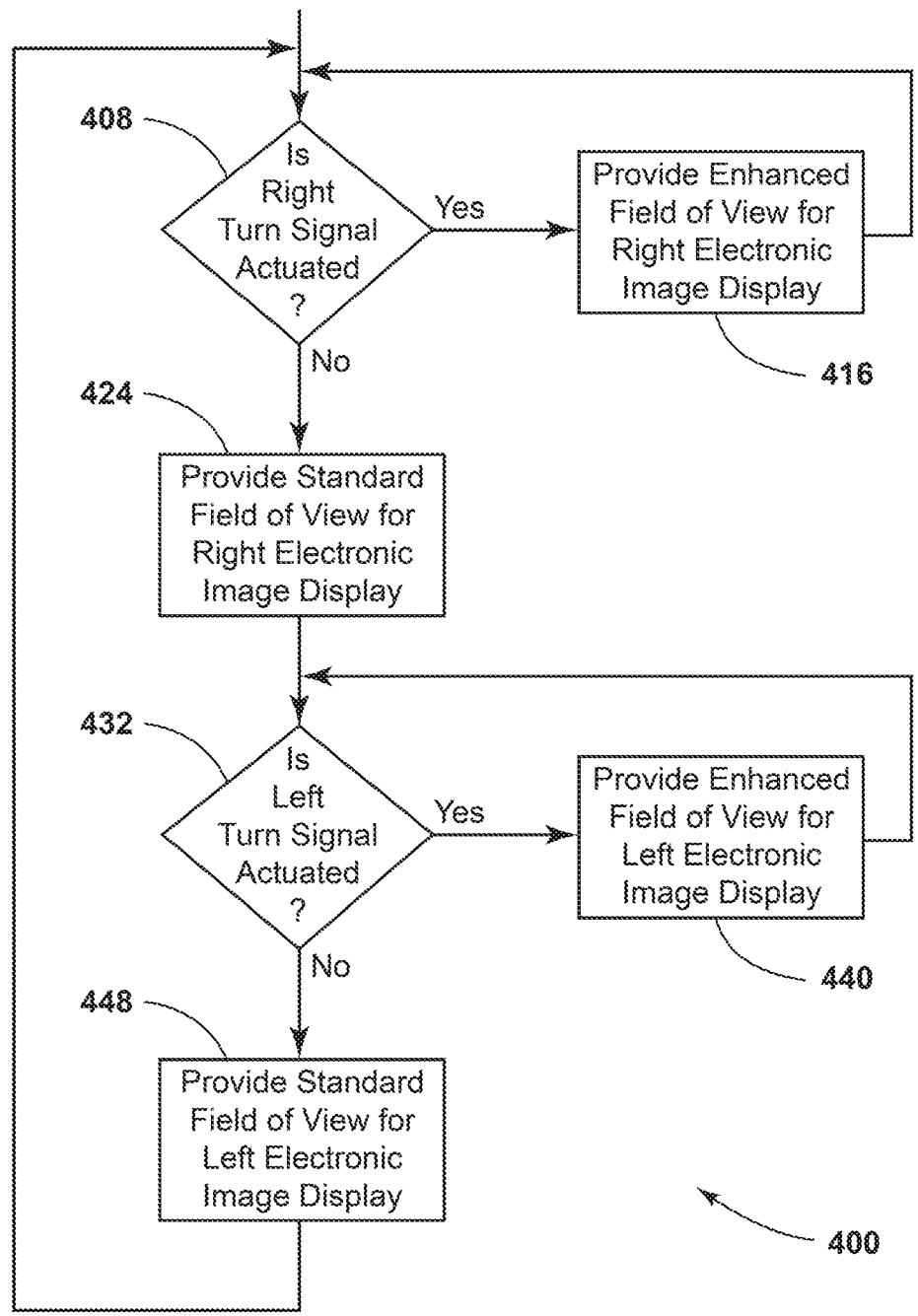
FIG. 5 illustrates a flow chart of an embodiment for operation of the side electronic image displays during turn signal actuation.

FIG. 5 shows a flow chart 400 of the operation of the right side electronic image display 94 for the electronic unit 34 shown in FIG. 1 when an additional condition is determined. More specifically, FIG. 5 is directed to selectively changing the fields of view of the side electronic image displays 84, 94 in response to actuation of the appropriate turn signal.

In FIG. 5, at decision step 408, the electronic processor 40 determines whether the right front turn signal 130 and the right rear turn signal 134 are actuated. When the right front and rear turn signals are actuated, the electronic processor advances to step 416. At step 416, the field of view for the right side electronic image display 94 increases or expands from a standard FoV for normal driving to an enhanced field of view (FoV) value (for example, from 40 degrees to 60 degrees in one embodiment). Thereafter, the electronic processor 40 returns to decision step 408. So long as the right front and rear turn signals are actuated, the right side electronic image display 94 remains with the enhanced FoV at an enlarged value. Normal driving corresponds to the standard field of view when driving in a forward direction without changing lanes or turning.

Figure 6:
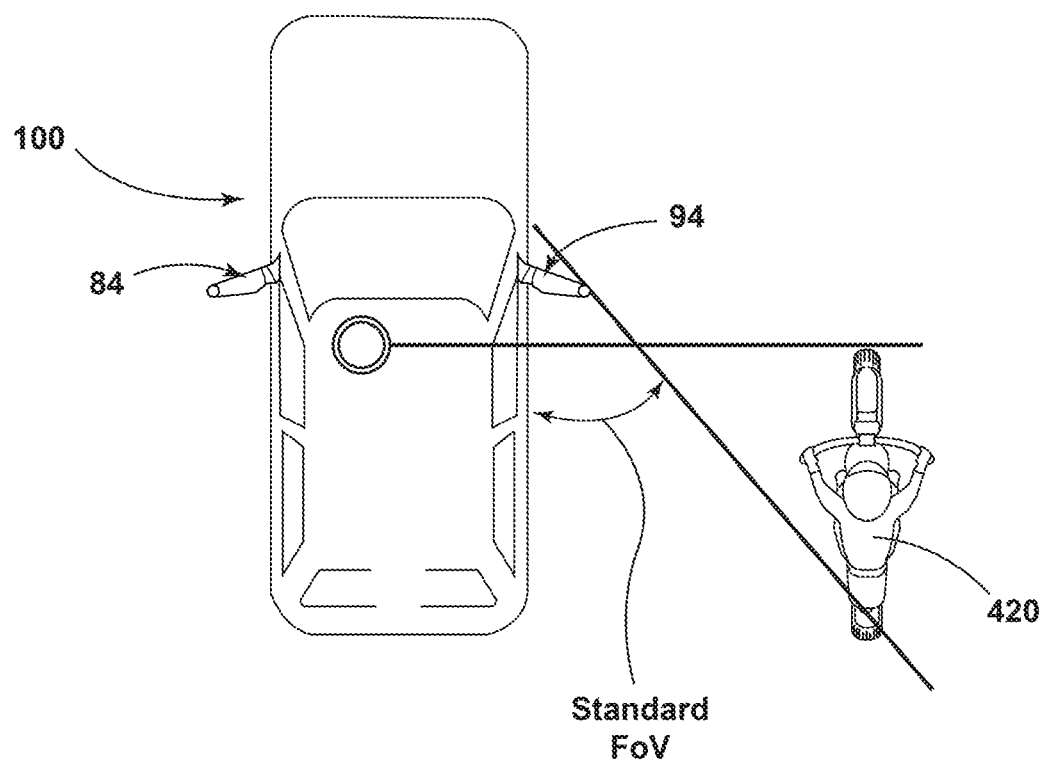
FIG. 6 illustrates a top view of a vehicle and a motorcycle disposed in a blind spot thereof.

FIG. 6 shows a top view of a vehicle 100 and a motorcycle 420 disposed in a blind spot thereof. Initially, the right side electronic image display 94 has a standard field of view. The motorcycle 420 is almost not viewable to a driver of the vehicle 100. Increasing the field of view to an enhanced field of view (e.g., in response to activating the right turn signal) places the adjacent motorcycle 420 within a portion of the enhanced field of view of a driver in the vehicle 100.

Returning to FIG. 5, at decision step 408, when the right front and rear turn signals are not actuated, the electronic processor advances to step 424. At step 424, the electronic processor provides or maintains a standard field of view for the right side electronic image display 94 in one embodiment. Thereafter, the electronic processor 40 advances to decision step 432.

At decision step 432, the electronic processor 40 determines whether the left front turn signal 120 and left rear turn signal 124 are actuated. When the left front and rear turn signals are actuated, the decision step 432 advances to step 440. At step 440, the field of view for the left side electronic image display 84 increases or expands from a normal driving value to an enhanced FoV (for example, from 40 degrees to 60 degrees in one embodiment). Thereafter, the electronic processor 40 returns to decision step 432. So long as the left front and rear turn signals are actuated, the left side electronic image display 84 remains with an enhanced field of view.

At decision step 432, when the left front turn signal 120 and the left rear turn signal 124 are not actuated for a left turn, the electronic processor advances to step 448. At step 448, the electronic processor 40 provides or maintains a standard field of view for the left side electronic image display 84 in one embodiment. Thereafter, the electronic processor 40 advances to decision step 408.

Use of a turn signal indicates a desire to make a turn or switch driving lanes. By increasing to the enhanced field of view in the turning direction, a driver is able to see an object in a blind spot as illustrated in FIG. 6.

While a standard field of view is 40 degrees and an enhanced field of view is 60 degrees when operating a turn signal are disclosed in one embodiment, other values are possible. In another embodiment, the initial field of view is in a range between about 30 degrees and about 50 degrees. The enhanced field of view when a turn signal is actuated is in a range between about 55 degrees and about 85 degrees. Other field of view values are also contemplated. In another embodiment, the standard field of view is about 38 degrees and the enhanced field of view is 62 degrees.

Roundabout Side Electronic Image Display Expanded Field of View

Figure 7:
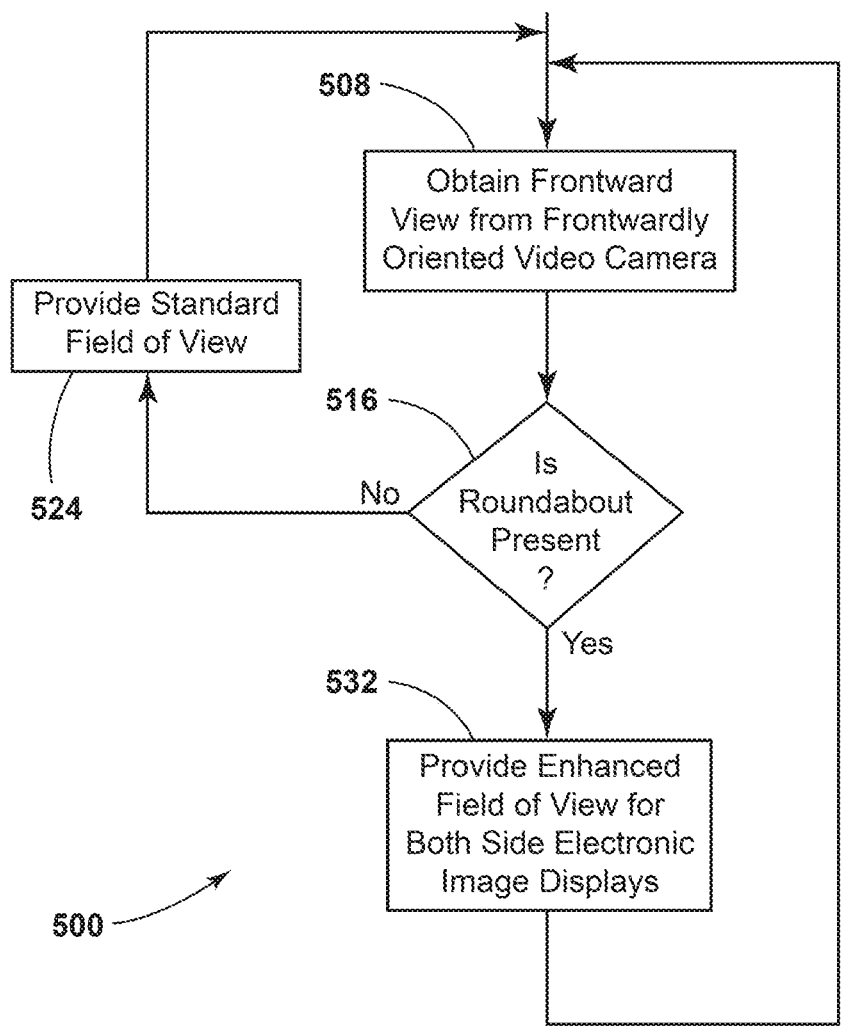
FIG. 7 illustrates a flow chart of an embodiment for operation of the side electronic image displays at a roundabout.

FIG. 7 shows a flow chart 500 of the operation of a roundabout or traffic circle sensing arrangement for expanding the video images provided to the side electronic image displays 84, 94 when approaching and entering a roundabout.

In operation, at step 508, the electronic processor 40 receives frontward images from the a frontwardly oriented video camera 54. The electronic processor 40 then advances to step 516.

At decision step 516, the electronic processor 40 performs image analysis to determine whether a roundabout is being approached. The image analysis includes looking for roadway paths and/or signs defining or designating a roundabout. When a roundabout is not detected at decision step 516, the electronic processor advances to step 524.

At step 524, the electronic processor 40 operates to maintain or provide a standard field of view for each of the side electronic image displays 84, 94. In some embodiments, however, such a display would not be maintained when a turn signal is operating, which overrides the arrangement shown in FIG. 7. The electronic processor 40 returns to step 508 and repeats steps 508, 516, 524 until a roundabout is detected at step 516.

When the image analysis of the video signals indicates a roundabout is being approached or the vehicle is within a roundabout at decision step 516, the electronic processor 40 advances to step 532.

At step 532, the electronic processor controls the video images provided to the left side electronic image display 84 and the right side electronic image display 94 to provide an enhanced field of view for both of the side electronic image displays 84, 94. That way, a driver entering a roundabout is able to switch lanes to the left or right depending on the situation and driving goal.

After step 532, the electronic processor 40 returns to step 508. Steps 508, 516, 532 are repeated until the vehicle 100 exits the roundabout or driving circle.

Figure 8:
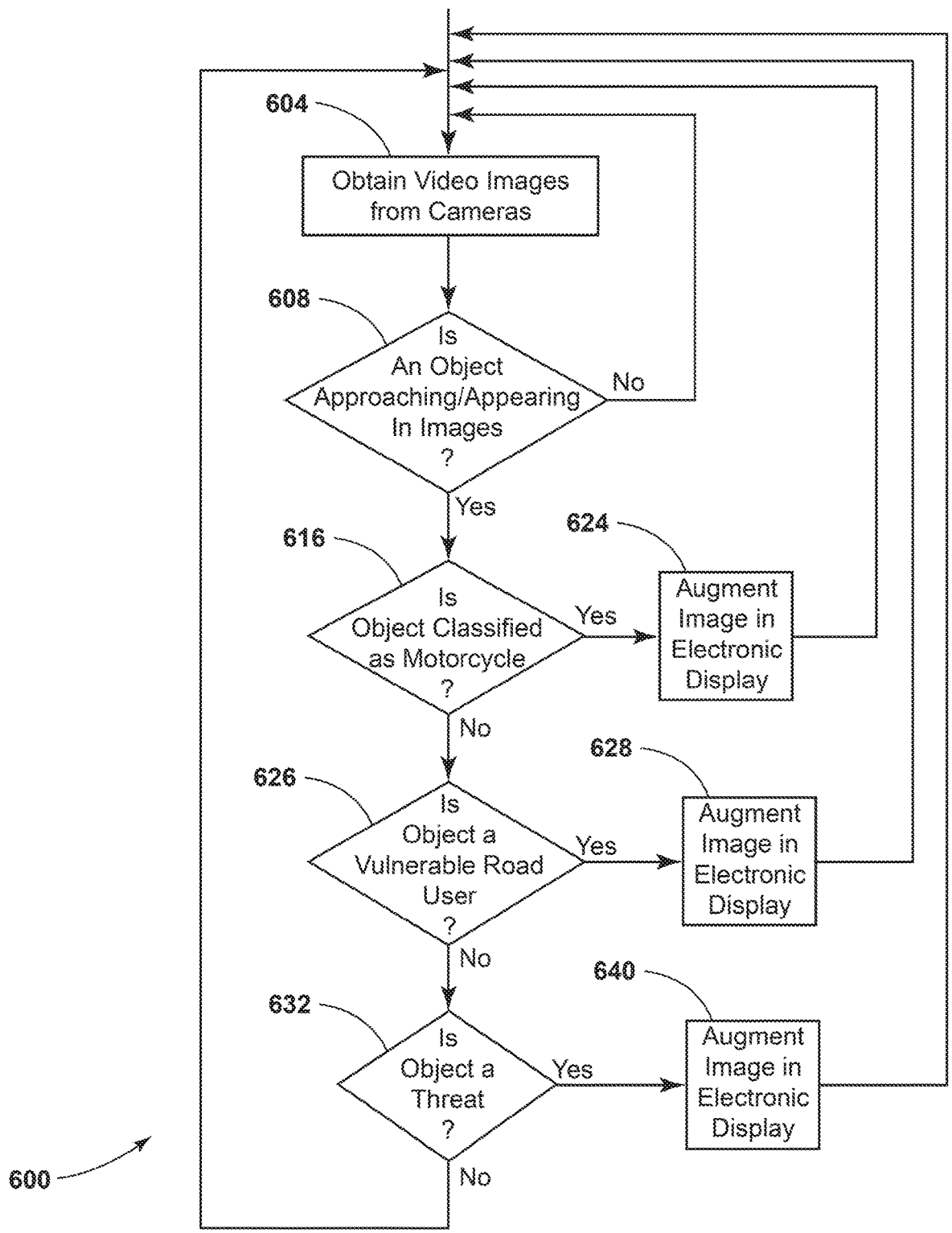
FIG. 8 illustrates a flow chart of an embodiment for operation of the electronic image display(s) when an object is detected.

While a 40 degrees standard field of view and an enhanced 60 degrees field of viewing when entering or driving within a roundabout or traffic circle are disclosed in one embodiment, other values are possible. In one embodiment, the standard field of view is in a range between about 30 degrees and about 50 degrees. The enhanced field of view when a roundabout is detected is in a range between about 55 degrees and about 85 degrees in one embodiment. Other field of view values are also contemplated Object Detection FIG. 8 shows a flow chart 600 of the operation of an object analysis arrangement for determining presence of an object and providing an enhanced or augmented warning to a driver about objects detected in the video images from the video cameras 64, 68, 74 provided to the electronic image displays 84, 88, 94.

At step 604, the electronic processor 40 obtains video images from the video cameras 64, 68, 74. Thereafter, at decision step 608, image analysis is performed by the electronic processor 40 or another electronic processor to determine the presence of objects within the video images from the video cameras 64, 68, 74. When no objects are detected, the electronic processor 40 returns to step 604 and repeats the step of obtaining and analyzing images.

When an object is detected at decision step 608, the electronic processor advances to decision step 616. At decision step 616, the electronic processor 40 determines whether the object is classified as a motorcycle. If yes, the electronic processor 40 advances to step 624.

At step 624, the image in the particular corresponding electronic image display 84, 88, 94 is provided with the object. The object is further provided with an augmented overlay symbol. In one example, wherein the object is detected by the right side video camera 74, the overlay symbol is provided on the right side electronic image display 94. In the instance of the motorcycle, the overlay symbol is an outlined shape of a triangle surrounding the motorcycle in one embodiment. Thereafter, the electronic processor 40 returns to step 604 and repeats the process.

When the object at decision step 616 is not classified as a motorcycle, the electronic processor 40 advances to decision step 626. At decision step 626, the electronic processor 40 determines whether the object is classified as a vulnerable road user. A vulnerable road user is typically a cyclist, such as a bicycle or a pedestrian. If yes, the electronic processor advances to step 628.

At step 628, the image in the particular corresponding electronic image display 84, 88, 94 is provided with the vulnerable road user. The vulnerable road user is further provided with an augmented overlay symbol. In one embodiment, wherein the object is detected by the left side video camera 64, the overlay symbol is provided on the left side electronic image display 84. In the instance of a vulnerable road user, the overlay symbol is an outlined shape of a triangle surrounding the vulnerable road user. Thereafter, the electronic processor 40 returns to step 604 and repeats the process.

When the object at decision step 626 is not classified as a vulnerable road user, the electronic processor 40 advances to decision step 632. At decision step 632, the electronic processor 40 determines whether the object is a threat. One example of a threat is fast approaching large vehicle or the like. When no object threat is determined, the electronic processor 40 returns to step 604 and repeats the process. When a threat is determined at decision step 632, the electronic processor 40 advances to step 640.

At step 640, the electronic processor 40 provides an augmented image to the corresponding electronic image display. In the example of a fast moving semi-tractor trailer approaching from the rear of the vehicle 100, the rearview electronic image display 88 provides an exclamation mark or other symbol indicating an approaching threat. After step 640, the electronic processor 40 returns to step 604 to repeat the process.

While a triangle symbol encompassing a motorcycle is disclosed, other symbols are also contemplated. In one embodiment, the physical size of a motorcycle is increased while maintaining the distance in the image of the motorcycle so that the motorcycle is more noticeable. Audio warnings, in addition to or instead of the visual warnings, are also contemplated in some embodiments for the motorcycle, vulnerable road user and especially embodiments that detect threats.

Preset Arrangement

Figure 9:
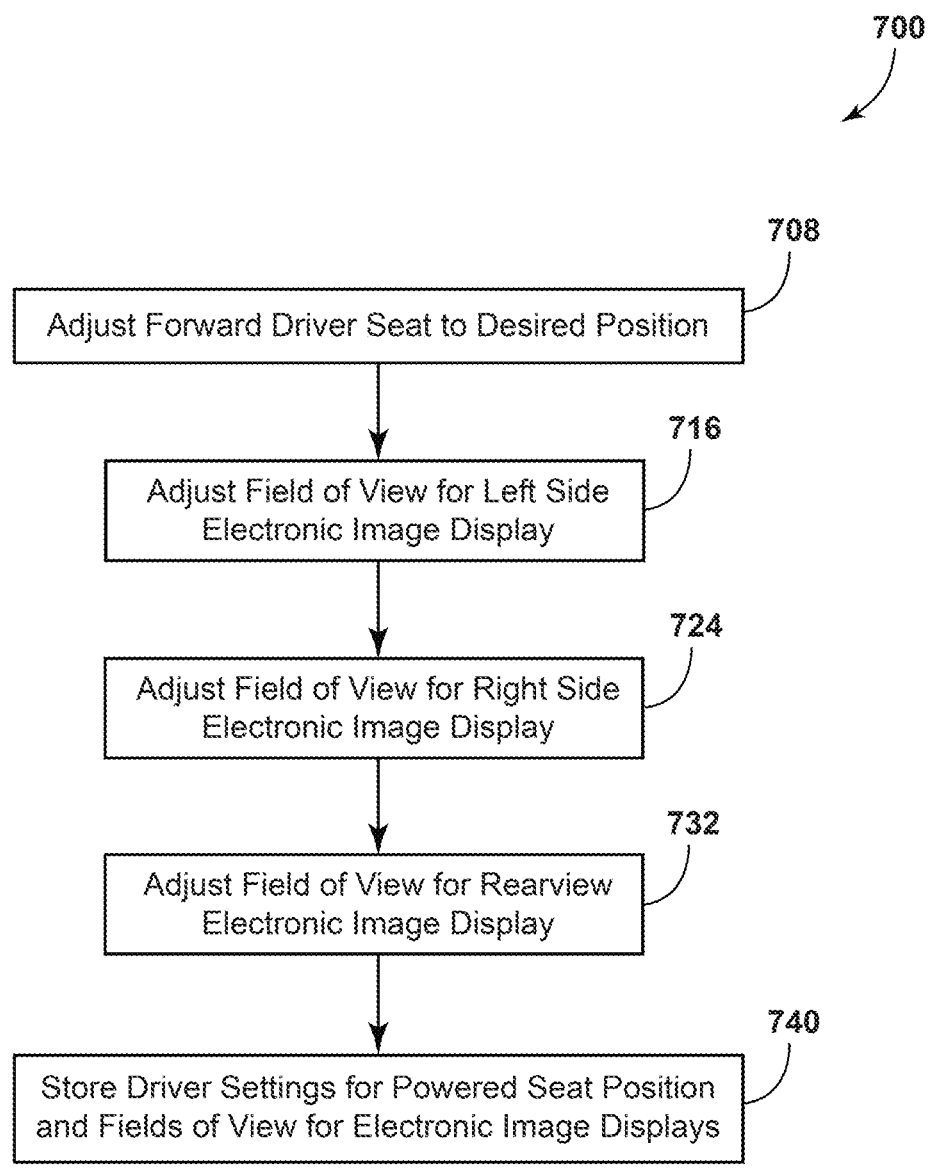
FIG. 9 illustrates a flow chart of an embodiment wherein preset values are provided for a vehicle driver seat and for the electronic image displays.

FIG. 9 shows a flow chart 700 of the operation of a driver present arrangement for presetting a position for a driver seat and presetting the portions of the video images provided to each of the side electronic image displays 84, 94 and the rearview electronic image display 88.

In the arrangement shown in the flow chart 700, in a first step 708, a driver sets the height, longitudinal position to provide leg room and the seat back angle to a comfortable position. Upon achieving the position, the electronic processor 40 advances to step 716.

At step 716, a driver uses the input device 80 and a display to adjust a field of view corresponding to an initial position of the portions of the video images from the left side video camera 64 that are provided to the left side electronic image display 84 that correspond with the position of a driver in a powered driver seat. In some embodiments, the field of view also can be adjusted to be increased or decreased depending on the desire of a driver (e.g., with zoom in and zoom out buttons of the input device 80). The electronic processor advances to step 724.

At step 724, a driver uses the input device 80 and a display to adjust an initial field of view corresponding to an initial position of the portions of the video images from the right side video camera 74 that are provided to the right side electronic image display 94 that correspond with the seat adjustment position of the driver in the driver seat. In some embodiments, the field of view also can be adjusted to be increased or decreased depending on the desire of a driver (e.g., with zoom in and zoom out buttons of the input device 80). The electronic processor 40 advances to step 732.

At step 732, a driver uses the input device 80 and a display to adjust a field of view for the portions of the video images from the rearwardly oriented video camera 68 that are provided to the rearview electronic image display 88. In some embodiments, the field of view also can be adjusted to be increased or decreased depending on the desire of a driver (e.g., with zoom in and zoom out buttons of the input device 80). The electronic processor 40 advances to step 740.

At step 740, a driver uses the input device 80 and a display to store the vehicle seat adjustment position and the fields of view for the portions of the video images for the left side electronic image display 84, the rearview electronic image display 88, and the right side electronic image display 94. For example, the driver presses a save button on the input device 80 to store the vehicle seat adjustment positions and fields of view.

Thereafter, when a user enters the vehicle, he utilizes the input device 80 to obtain seat and image display information for a group of users. The driver selects his user name or group identifier (for example, from a plurality of user names or group identifiers), and a driver seat is automatically adjusted to a desired preselected driver seat adjustment position, along with the electronic image displays 84, 88, 94. Thus, a preset arrangement is provided for a driver that includes at least a driver seat adjustment position, the initial position for the left side electronic image display, and the initial position for the right side electronic image display 94. Thereafter, the vehicle 100 is ready for operation.

Zoom Feature

Besides changing portions of the field of view provided in the rearview electronic image display 88, the electronic processor 40 can determine movement of the head of a driver toward the rearview electronic image display 88 and increase the size of the image while narrowing the field of view to provide a zoom effect that simulates the operation of a mirror. Such a zoom effect can also be provided for head movement toward the side electronic image displays 84, 94. However, an increased zoom effect decreases the field of view.

ADDITIONAL EMBODIMENT(S)

While FIG. 1 shows a single interior driver monitoring camera 76, multiple cameras are contemplated to obtain driver images and use triangulation and/or other methods to determine a direction for a face and/or eyes of a vehicle driver and distances to from the respective electronic image displays 84, 88, 94.

Although the system depicts components as logically separate, such depiction is merely for illustrative purposes. In some embodiments, the illustrated components may be combined or divided into separate software, firmware and/or hardware. Regardless of how they are combined or divided, these components may be executed on the same computing device or may be distributed among different computing devices or electronic processors 40 connected by one or more networks or other suitable communication means.

Various features, advantages, and embodiments are set forth in the following claims.

What is claimed is:

1. A rearward viewing system for a driver of a vehicle, the rearward viewing system comprising:
    a frontwardly oriented video camera for providing a frontward image taken frontwardly and outwardly from the vehicle;
    a left side video camera for obtaining left side video images taken rearwardly and outwardly from a left side of the vehicle;
    a left side electronic image display disposed near a front left side window for displaying portions of the left side video images received from the left side video camera;
    a right side video camera for obtaining right side video images taken rearwardly and outwardly from a right side of the vehicle;
    a right side electronic image display disposed near a front right side window for displaying portions of the right side video images received from the right side video camera;
    a vehicle interior driver monitoring camera for sensing an upper body position of a driver;
    an electronic processor and a memory, wherein the electronic processor is configured to:
        receive an upper body position of a driver from the vehicle interior driver monitoring camera;
        from an upper body position, determine portions of the left side video images to display on the left side electronic image display, and to determine portions of the right side video images to display on the right side electronic image display;
        determine movements of an upper body position of a driver from the vehicle interior driver monitoring camera;
        adjust a field of view of the left side video images that are displayed on the left side electronic image display by changing portions of the left side video images that are provided to the left side electronic image display in response to the movements of an upper body position of a driver;
        determine when the vehicle is approaching a traffic circle or roundabout from the frontward image, and upon approaching the traffic circle or roundabout, increase from a standard field of view to an enhanced field of view for the left side electronic image display and for the right side electronic image display.

2. The rearward viewing system according to claim 1, wherein the electronic processor is configured to adjust a field of view of the right side video images that are displayed on the right side electronic image display by changing the portions of the right side video images that are provided to the right side electronic image display in response to the movements of an upper body position of a driver.

3. The rearward viewing system according to claim 1, wherein a complete view field of the left side video camera is in a range from about 80 degrees to about 120 degrees, and wherein the field of view of the portions of the left side video images that are displayed on the left side electronic image display is in a range from about 40 degrees to about 60 degrees.

4. The rearward viewing system according to claim 3, wherein a shifting of a driver away from the left side electronic image display changes the portions of the left side video images that are displayed.

5. The rearward viewing system according to claim 3, wherein the left side electronic image display has a standard field of view during normal driving and increases to an enhanced field of view when a turn signal is activated for a left turn.

6. The rearward viewing system according to claim 1, including:
    a rearwardly oriented video camera for obtaining video images rearwardly from the vehicle; and
    a rearview electronic image display disposed at a front central location in an interior of the vehicle for providing the video images from the rearwardly oriented video camera to a driver;
    wherein the left side video camera is fixedly mounted and thus unable to pan.

7. The rearward viewing system according to claim 1, wherein an object detected in the left side video images is provided with an augmented overlay symbol provided on the left side electronic image display.

8. The rearward viewing system according to claim 7, wherein the overlay symbol is an outlined shape of a triangle when the object classified is a motorcycle or as a vulnerable road user.

9. The rearward viewing system according to claim 1, wherein a driver utilizes an input device to adjust an initial position of the left side video images that are provided on the left side electronic image display that corresponds with an upper body position of a driver in the vehicle and to adjust an initial position of the right side video images that are provided on the right side electronic image display that corresponds with an upper body position of a driver in the vehicle, and wherein a preset arrangement is provided for a driver that includes at least a seat adjustment position, the initial position for the left side electronic image display, and the initial position for the right side electronic image display.

10. A method for providing rearward viewing to a driver of a vehicle including an electronic processor, the method comprising:
    obtaining a frontward image frontwardly and outwardly from the vehicle with a frontwardly oriented video camera;
    obtaining left side video images rearwardly and outwardly from a left side of the vehicle with a left side video camera;
    receiving the left side video images at the electronic processor;
    determining an upper body position of a driver with a vehicle interior driver monitoring camera;
    receiving an upper body position at the electronic processor;
    from an upper body position of a driver, the electronic processor determining a portion of the left side video images for display on a left side electronic image display disposed near a front left side window of a vehicle;

determining movements of an upper body position of a driver; and adjusting a field of view of the left side video images displayed on the left side electronic image display based on the movements of an upper body position of a driver by changing the portion of the left side video images provided to the left side electronic image display;

determining when the vehicle is approaching a traffic circle or roundabout from the frontward image, and upon approaching the traffic circle or roundabout, increasing from a standard field of view to an enhanced field of view for the left side electronic image display.

11. The method according to claim 10, wherein the field of view is adjusted so that the portions of the left side video images provided to the left side electronic image display are changed to provide a mirror simulating effect during the movements of an upper body position of a driver.

12. The method according to claim 10, wherein a complete field of view of the left side vide camera is in a range from about 80 degrees to about 120 degrees, and wherein the field of view of the portions of the left side video images that are displayed on the left side electronic image display is in a range from about 40 degrees to about 60 degrees.

13. A method for providing rearward and outward viewing to a driver of a vehicle including an electronic processor, the method comprising:

obtaining a frontward image frontwardly and outwardly from the vehicle with a frontwardly oriented video camera;

obtaining side video images rearwardly and outwardly from a side of the vehicle with a side video camera;

determining an upper body position of a driver with a vehicle interior driver monitoring camera;

from an upper body position of a driver, determining a portion of the side video images for display on a side electronic image display;

displaying portions of the side video images on the side electronic image display disposed near a front side window of the vehicle;

determining movements of an upper body position of a driver;

adjusting the field of view by changing the portions of the side video images displayed on the side electronic image display based on the movements of an upper body position of a driver by changing the portions of the side video images provided to the side electronic image display;

determining when the vehicle is approaching a traffic circle or roundabout from the frontward image, and upon approaching the traffic circle or roundabout, increasing from a standard field of view to an enhanced field of view for the side electronic image display.

14. The method according to claim 13, wherein the side video camera is a left side video camera and the side electronic image display is a left side electronic image display, and wherein the left side video camera is disposed at a horizontal distal end of the left side electronic image display, wherein the left side video camera is fixedly mounted and thus unable to pan, and wherein the vehicle includes a right side video camera and a right side electronic image display, wherein upon approaching the traffic circle or roundabout, the increasing from the standard field of view to the enhanced field of view for the side electronic image display includes increasing to the enhanced field of view for both the left side electronic image display and the right side electronic image display.

15. The method according to claim 14, wherein a complete field of view of the left side video camera is in a range from about 80 degrees to about 120 degrees, and wherein the field of view of the portions of the left side video images that are displayed on the left side electronic image display is in a range from about 40 degrees to about 60 degrees.

16. The method according to claim 15, wherein shifting of the upper body of a driver to the right shifts the field of view of the portions of the left side video images provided on the left side electronic image display to the left, thus adding a previously unseen portion of the video image outwardly and horizontally to the left rear side of the vehicle and removing the portions of the left side video images corresponding to inside and near the vehicle.

17. The method according to claim 14, wherein an object detected in the left side video image is provided with an augmented overlay symbol.

18. The method according to claim 17, wherein the overlay symbol includes an outlined shape of a triangle when the object detected is classified as a motorcycle or as a vulnerable road user.

19. The method according to claim 14, wherein a standard field of view is provided by the left side electronic image display during normal driving and increases to an enhanced field of view when a turn signal is activated for a left turn.

* * * * *